United States Patent
Itoh

(10) Patent No.: US 8,077,966 B2
(45) Date of Patent: Dec. 13, 2011

(54) BINARIZING DEVICE AND COMPUTER READABLE MEDIUM

(75) Inventor: Atsushi Itoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 575 days.

(21) Appl. No.: 12/343,615

(22) Filed: Dec. 24, 2008

(65) Prior Publication Data

US 2009/0175534 A1 Jul. 9, 2009

(30) Foreign Application Priority Data

Jan. 7, 2008 (JP) ................................ 2008-000618

(51) Int. Cl.
*G06K 9/34* (2006.01)
(52) U.S. Cl. ...................................... 382/165; 382/173
(58) Field of Classification Search .......... 382/162–167; 358/500–540
See application file for complete search history.

(56) References Cited

U.S. PATENT DOCUMENTS

| | | | | |
|---|---|---|---|---|
| 4,228,467 A * | 10/1980 | de Loye et al. | ............... | 382/246 |
| 4,914,508 A * | 4/1990 | Music et al. | ............. | 375/240.01 |
| 5,140,412 A * | 8/1992 | Shishido et al. | ............. | 358/539 |
| 2008/0154747 A1 * | 6/2008 | Tarbell et al. | ................... | 705/27 |

FOREIGN PATENT DOCUMENTS

| | | |
|---|---|---|
| JP | A-06-121161 | 4/1994 |
| JP | A-11-205617 | 7/1999 |
| JP | A-2001-053977 | 2/2001 |
| JP | A-2001-275000 | 10/2001 |
| JP | A-2002-288589 | 10/2002 |

OTHER PUBLICATIONS

Japanese Office Action issued in Japanese Patent Application No. 2008-000618 on Jan. 6, 2010. (with translation).

* cited by examiner

*Primary Examiner* — Jingge Wu
(74) *Attorney, Agent, or Firm* — Oliff & Berridge, PLC

(57) ABSTRACT

A binarizing device includes: a difference vector calculation unit that calculates a difference vector between an average color in a peripheral pixel region and a current color of a current pixel; a selection unit that selects one of the average color and the current color as a significant color; and an output unit that, in a case where predetermined conditions are satisfied, outputs one of binary values, and that, in a case where at least one of the predetermined conditions is not satisfied, outputs the other of the binary values, wherein the selection unit calculates a run length of each of the average color and the current color in a plurality of directions in the peripheral pixel region, and selects one of the average color and the current color, which has a shorter run length, as the significant color.

12 Claims, 8 Drawing Sheets

FIG. 3A

PERIPHERAL PIXEL REGION
CURRENT PIXEL

FIG. 3B

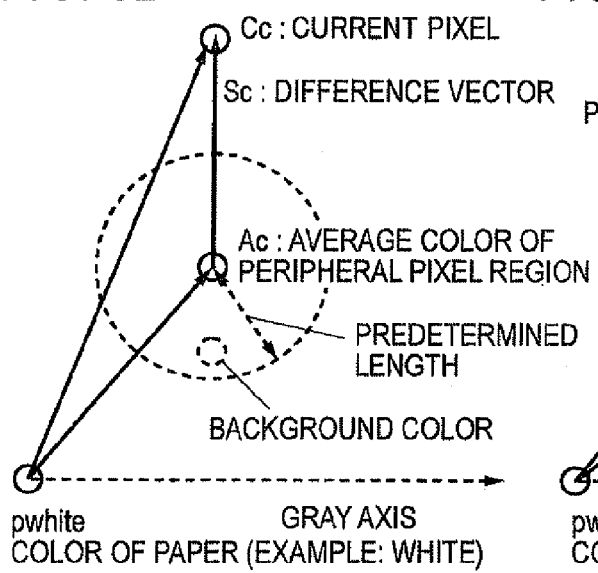
Cc : CURRENT PIXEL
Sc : DIFFERENCE VECTOR
Ac : AVERAGE COLOR OF PERIPHERAL PIXEL REGION
PREDETERMINED LENGTH
BACKGROUND COLOR
pwhite — GRAY AXIS
COLOR OF PAPER (EXAMPLE: WHITE)

FIG. 3C

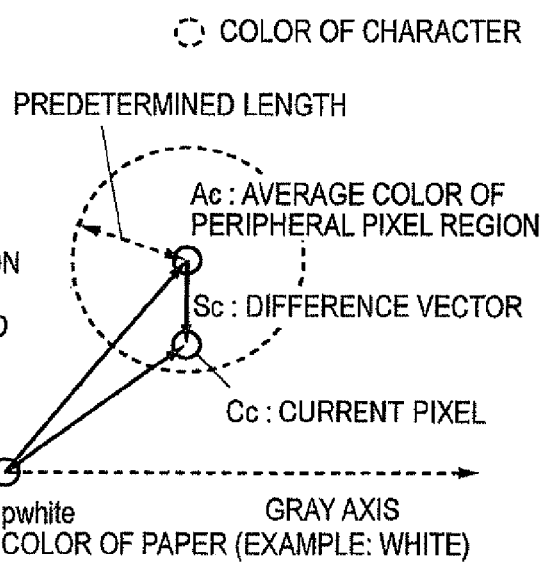
COLOR OF CHARACTER
PREDETERMINED LENGTH
Ac : AVERAGE COLOR OF PERIPHERAL PIXEL REGION
Sc : DIFFERENCE VECTOR
Cc : CURRENT PIXEL
pwhite — GRAY AXIS
COLOR OF PAPER (EXAMPLE: WHITE)

*FIG. 4A*     *FIG. 4B*     *FIG. 4C*
 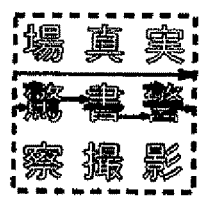 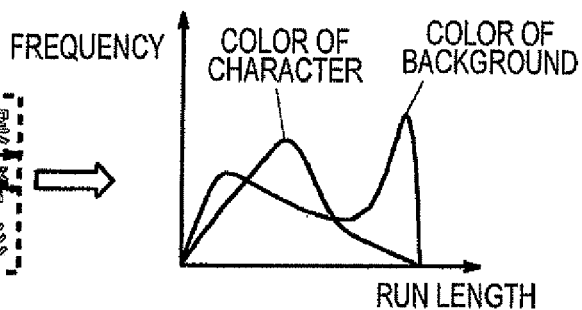
*FIG. 4D*
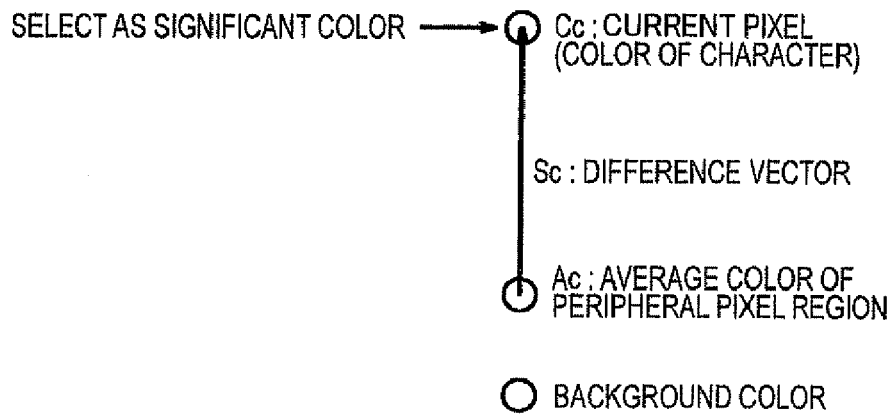

BINARIZING DEVICE AND COMPUTER READABLE MEDIUM

CROSS-REFERENCE TO RELATED APPLICATIONS

This application is based on and claims priority under 35 U.S.C. 119 from Japanese Patent Application No. 2008-000618 filed Jan. 7, 2008.

BACKGROUND

1. Technical Field

The present invention relates to a binarizing device and a computer readable medium.

2. Related Art

Conventionally, for example, when a color image is outputted from a black and white printer, the color image is converted into a black and white image. Concerning the prior art for converting a color image into a black and white image, in the case where it is a color image of 8 or 16 colors, the color image can be reproduced as a black and white image by making a conversion in such a manner that each color is made to correspond to the gradation of black and white. However, in the case of a full color image, since it is possible to designate 167 million or more colors, it is difficult that each color is made to correspond to the gradation of black and white. Even when each color is made to correspond to the gradation of black and white, there is a possibility that a user can not recognize a difference in the color by the difference in the gradation.

SUMMARY

According to an aspect of the present invention, a binarizing device includes: a difference vector calculation unit that, in a case where each pixel of a color image is made to be a current pixel in order and a region, which has a predetermined size and includes the current pixel, is set to be a peripheral pixel region, calculates a difference vector between an average color of the peripheral pixel region and a current color of the current pixel; a selection unit that selects one of the average color and the current color as a significant color; and an output unit that, in a case where the following conditions (1) and (2) are satisfied, outputs one of binary values, and that, in a case where at least one of the following conditions (1) and (2) is not satisfied, outputs the other of the binary values: (1) a length of the difference vector is not less than a predetermined value; and (2) the selection unit selects the current color as a significant color, wherein the selection unit calculates a run length of each of the average color and the current color in a plurality of directions in the peripheral pixel region, and selects one of the average color and the current color, which has a shorter run length, as the significant color.

BRIEF DESCRIPTION OF THE DRAWINGS

Exemplary embodiment of the present invention will be described in detail based on the following figures, wherein:

FIGS. 3A and 3D are schematic illustrations showing an example of the specific action executed in the first embodiment of the present invention;

FIGS. 4A to 4D are schematic illustrations showing an example of the selecting method of selecting a significant color in the selecting portion of the first embodiment of the present invention;

DETAILED DESCRIPTION

Figure 1:
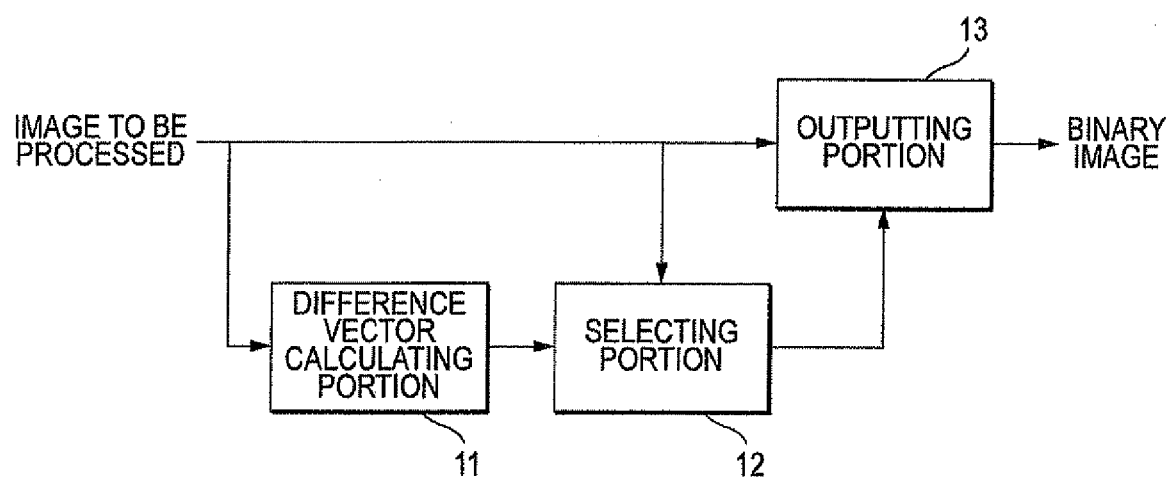
FIG. 1 is an arrangement view showing the first embodiment of the present invention.

FIG. 1 is an arrangement view showing the first embodiment of the present invention. In the view, reference numeral 11 is a difference vector calculation portion, reference numeral 12 is a selecting portion and reference numeral 13 is an outputting portion. An image to be binarized is a color image. Each pixel of the color image to be binarized is made to be a current pixel in order and a result of the binarizing processing of the current pixel is outputted. At the time of binarizing processing, a predetermined size region containing the current pixel is made to be a peripheral pixel region. Referring to the pixels in the peripheral pixel region, the binarizing processing is executed.

The difference vector calculating portion 11 calculates the difference vector Sc of the average color Ac and the color Cc of the current pixel in the peripheral pixel region. A direction of the difference vector Sc is a direction from the average color Ac to the color Cc of the current pixel in this case.

The selecting portion 12 selects one of the average color Ac and the color Cc of the current pixel as a significant color. As an example of the selecting method, the number of pixels, in which similar colors continue in one direction or in a plurality of directions in the peripheral pixel region, is calculated out as a run length and a color, the run length of which is smaller, may be selected as a significant color. For example, in the case of an image in which a character, the color of which is different from the background color, is drawn, there is a tendency that the run length of the character color is decreased and the run length of the background color is increased. In this case, the character color is selected as a significant color. In this connection, an intermediate color of the difference vector Sc is made to be a threshold value and a color of the peripheral pixel region is binarized and a run length of each value is calculated out by using the binarized peripheral pixel region, processing can be simplified. At the time of calculating the run length of the peripheral pixel region, the processing time may be reduced by decreasing the resolution.

As another method, one of the average color Ac and the color Cc of the current pixel, the lightness of which is lower, may be selected as a significant color. For example, in the case of a character and line image, colors of low lightness are used in many cases. Therefore, these colors are easily selected as a significant color. Alternatively, one of the average color Ac and the color Cc of the current pixel, the chroma of which is higher, may be selected as a significant color. A color in the region of high chroma becomes a primary color of the image in many cases. Therefore, the primary color is selected as a significant color. Of course, the significant color may be selected by using other methods.

In the case where a length of the difference vector Sc is not less than a predetermined value and the color Cc of the current pixel is selected as a significant color by the selecting portion 12, the outputting portion 13 outputs one of the binary values as a value after the binarization of the current pixel. In the case except for that, the outputting portion 13 outputs the other value as a value after the binarization of the current pixel.

Figure 2:
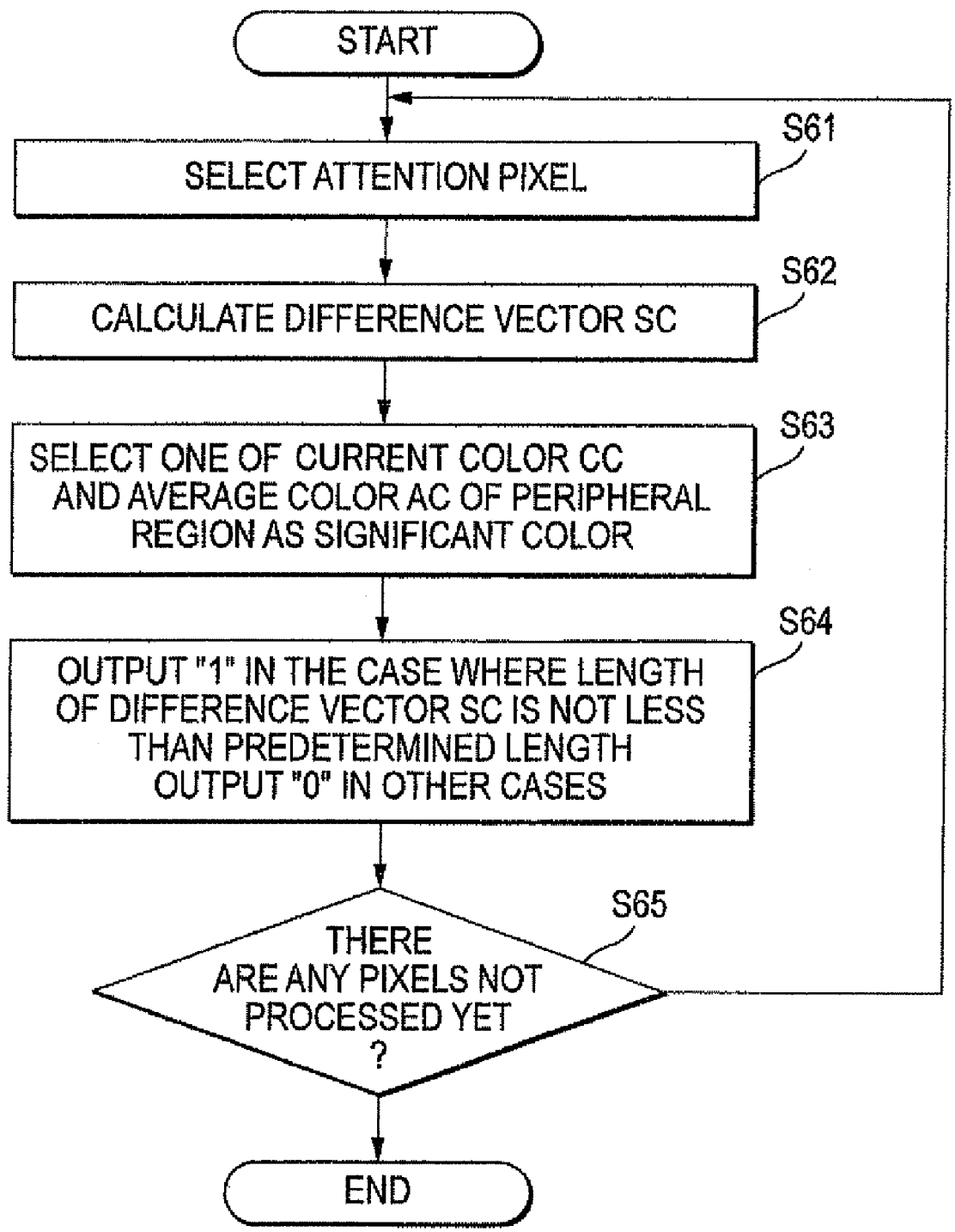
FIG. 2 is a flow chart showing an example of the operation in the first embodiment of the present invention.

FIG. 2 is a flow chart showing an example of the operation in the first embodiment of the present invention. In S61, a pixel, which has not been processed yet, in the image to be processed is made to be a current pixel and a predetermined size region containing the current pixel is made to be a peripheral pixel region.

In S62, the difference vector calculating portion 11 calculates the difference vector Sc of the current color Cc and the average color Ac of the peripheral pixel region.

In S63, the selecting portion 12 selects one of the average color Ac and the current color Cc as a significant color. Concerning the method of selecting the significant color, the method described before may be used.

In S64, in the case where a length of the difference vector Sc is not less than a predetermined value and the current color Cc is selected as a significant color by the selecting portion 12, the outputting portion 13 outputs one of the binary values (for example, "1") as a value after the binarization of the current pixel. In the case except for that, the outputting portion 13 outputs the other value (for example, "0") as a value after the binarization of the current pixel.

In S65, it is judged whether or not pixels not processed are remaining. In the case where pixels not processed are remaining, the program is returned to S61 and the current pixel is selected from the remaining pixels and subjected to the processing described above. In the case where all the pixels, which were not processed, have been processed, the processing is completed.

FIG. 3 is a schematic illustration showing an example of the specific action executed in the first embodiment of the present invention. FIG. 3A shows a portion of the image to be processed. This is an example in which an image of a character is drawn. In this example, the background is painted out by a background color and the character is drawn by a character color. For the convenience of illustration, the background color is shown by oblique lines and existence of the character color is shown by an outline character.

In S61, a current pixel is selected. In this case, a pixel on the character, which is indicated by the mark x in the drawing, is selected as a current pixel. Broken lines show a peripheral pixel region.

First, the difference vector calculating portion 11 calculates the difference vector Sc in S62. For the above reason, the average color Ac in the peripheral pixel region is calculated. Due to the foregoing, as shown in FIG. 3B, the difference vector Sc from the average color Ac to the current color Cc is found. In this stage, it has not been decided yet whether the average color Ac is a significant color or the current color Cc is a significant color. That is, in the case where an image after the binarization is made to be a black and white image, it is decided in the next S63 whether a portion of the current color Cc is made to be black and other portions are made to be white or the portion of the current color Cc is made to be white and the other portions are made to be black.

In S63, the selecting portion 12 selects whether the average color Ac or the current color Cc is made to be a significant color. An example is shown here in which a run length is used for the selecting method. FIGS. 4A to 4D are schematic illustrations showing an example of the selecting method of selecting a significant color in the selecting portion of the first embodiment of the present invention. In FIG. 4A, the peripheral pixel region shown in FIG. 3A is shown. In this peripheral pixel region, the binarization is executed here when an intermediate color of the difference vector Sc is used as a threshold value. A result of the binarization is shown in FIG. 4B. In this connection, any of the binary values may be allotted to the average color Ac side or the current color Cc side. In FIG. 4B, for the convenience of illustration, the average color Ac side is shown by white and the current color Cc side (the character) is shown by an outline character.

After the peripheral pixel region has been binarized, the number of the continuing values is counted so as to calculate a run length. Several arrows shown in the drawing are examples of the run. The number of pixels, in which white portions continue, and the number of pixels, in which black portions continue by line segments of characters, are counted. The counted value is the run length. In this connection, in FIG. 4B, the run in one direction is shown, however, the run lengths in a plurality of directions may be counted. Since it is sufficient to know a tendency of each color, for example, the run length may be counted by reducing the resolution of the peripheral pixel region.

An example of the relation between the run length and the frequency is shown in FIG. 4C. With respect to the line segment of the character, the run length is generally short. On the background in which no characters are existing, the run length is long. From this tendency, it is judged that the short run length is significant. That is, in this example, as shown in FIG. 4D, the current color Cc (the character color) side is judged to be a significant color.

In S64, according to the result of the selection of the significant color by the selecting portion 12, the output portion 13 judged whether or not the attention color Cc is selected as a significant color and whether or not a length of the difference vector Sc is not less than a predetermined value. In FIG. 3B, the range in the circle of the broken line drawn round the average color Ac is a range in which a length of the difference vector Sc is predetermined. When the difference vector Sc exceeds this range and the current color Cc is selected as a significant color, one of the binary values, for example, "1" is outputted as a value after the current pixel has been binarized.

FIG. 3C shows a case in which a pixel in the background portion is selected as a current pixel. In this case, the background color is a color of the current pixel and the run length of the average color Ac becomes short in the method shown in FIGS. 4A to 4D. Therefore, the average color Ac is selected as a significant color. Further, since a length of the difference vector Sc is not more than a predetermined value, the other of the binary values, for example, "0" is outputted as a value after the completion of binarizing the current pixel.

In S65, it is judged whether or not the pixels, which have not been processed yet, are remaining. In the case where the pixels, which have not been processed yet, are remaining, the program is returned to S61 and the current pixel is selected from the pixels which have not been processed yet, and the above processing of binarization is executed. When all the pixels have been processed, the processing of binarization is completed.

In this way, each pixel of the image to be processed is binarized. When one value (for example, "1") outputted from the outputting portion 13 is shown by black and the other value (for example, "0") is shown by white, characters are expressed as shown in FIG. 3D. For example, in the case where a difference between the lightness of the background color and that of the character color is small, conventionally, it is impossible to determine. Alternatively, by the method of the prior art, the contour is reproduced and the shape of the character is lost in some cases. However, in the first embodiment described above, the shape of the character can be reproduced as it is.

Figure 5:
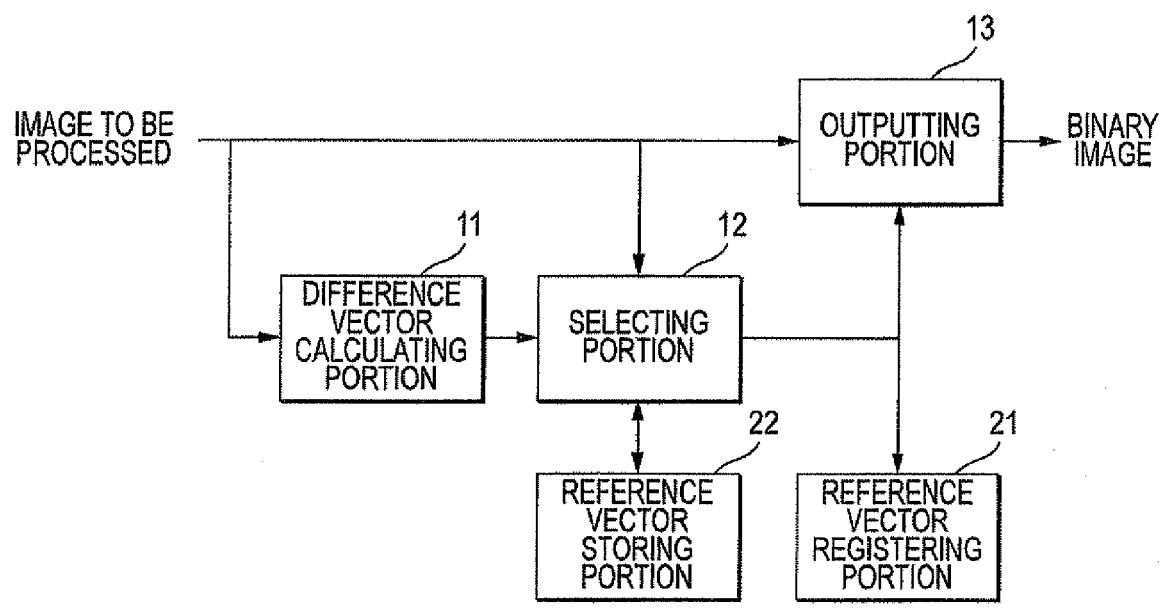
FIG. 5 is an arrangement view showing the second embodiment of the present invention.

FIG. 5 is an arrangement view showing the second embodiment of the present invention. In the view, reference numeral 21 is a reference vector registration portion and reference numeral 22 is a reference vector storage portion. The explanations of the difference vector calculating portion 11 and the outputting portion 13 are the same as the explanations made in the first embodiment.

In the selecting portion 12 in the second embodiment, first, the difference vector Sc calculated by the difference vector calculating portion 11 and the reference vector Pcini in a predetermined error range are extracted from the reference vector Pi (i=0, 1) stored in the reference vector storage portion 22. For example, the reference vector Pcini, the angle $\theta$ with the difference vector Sc of which is in a predetermined range, may be extracted.

In the case where the reference vector Pcini of not less than 1 can be extracted, the binarized vector Pc is decided from the reference vector Pcini according to a predetermined condition and a significant color of the binarized vector Pc is acquired. For example, the processed pixel in the peripheral pixel region, the frequency of the use of which is high, is selected. Alternatively, the pixel, the distance from the current pixel of the image of which is short, is selected. Alternatively, the pixel, the error with the difference vector Sc of which is small, is selected. That is, according to an arbitrary condition, the binarized vector Pc may be selected from the reference vector Pcini.

In the case where the reference vector, the angle $\theta$ with the difference vector Sc of which is in a predetermined range, does not exist, the difference vector Sc is made to be the binarized vector Pc. By the method explained in the first embodiment before, one of the average color Ac and the current color Cc is selected as a significant color.

In the case where a length of the binarized vector Pc is not less than a predetermined value and a color on the end side of the binarized vector Pc (the current color Cc in the case where the binarized vector Pc is the difference vector Sc) is selected as a significant color, on the basis of the binarized vector Pc (the difference vector Sc or one of the reference vectors Pcini) delivered from the selecting portion 12 and also on the basis of the significant color, the outputting portion 13 outputs one of the binary values as a value after the current pixel has been binarized. In the case except for that, the outputting portion 13 outputs the other value as a value after the current pixel has been binarized.

In the case where the selecting portion 12 determines that the difference vector and the reference vector in a predetermined error range are not stored in the reference vector storage portion 22, the reference vector registration portion 21 registers a set of the difference vector Sc, which is calculated by the difference vector calculating portion 11, and the significant color, which is selected with respect to the difference vector Sc, in the reference vector storage portion 22. Further, in the case where the selecting portion 12 extracts the difference vector and the reference vector Pcini which is in a predetermined error range, the reference vector Pcini which is selected as the binarized vector Pc is corrected by the difference vector Sc and the reference vector Pcini stored in the reference vector storage portion 22 may be rewritten. In this connection, the reference vector may be previously registered in the reference vector storage portion 22. In this case, this reference vector registration portion 21 may not be provided.

The reference vector storage portion 22 stores a set of the reference vector Pi (i=0, 1, ..., n−1) and the significant color corresponding to the reference vector. This set of the reference vector Pi and the significant color may be previously prepared or registered by the reference vector registration portion 21. Further, the information may be correspondingly stored which is used when the binarized vector Pc is selected from the difference vector Sc and a plurality of reference vectors Pcini, which are in a predetermined error range, in the selecting portion 12. For example, the information such as a frequency of the use and a pixel which has been used may be correspondingly stored.

Figure 6:
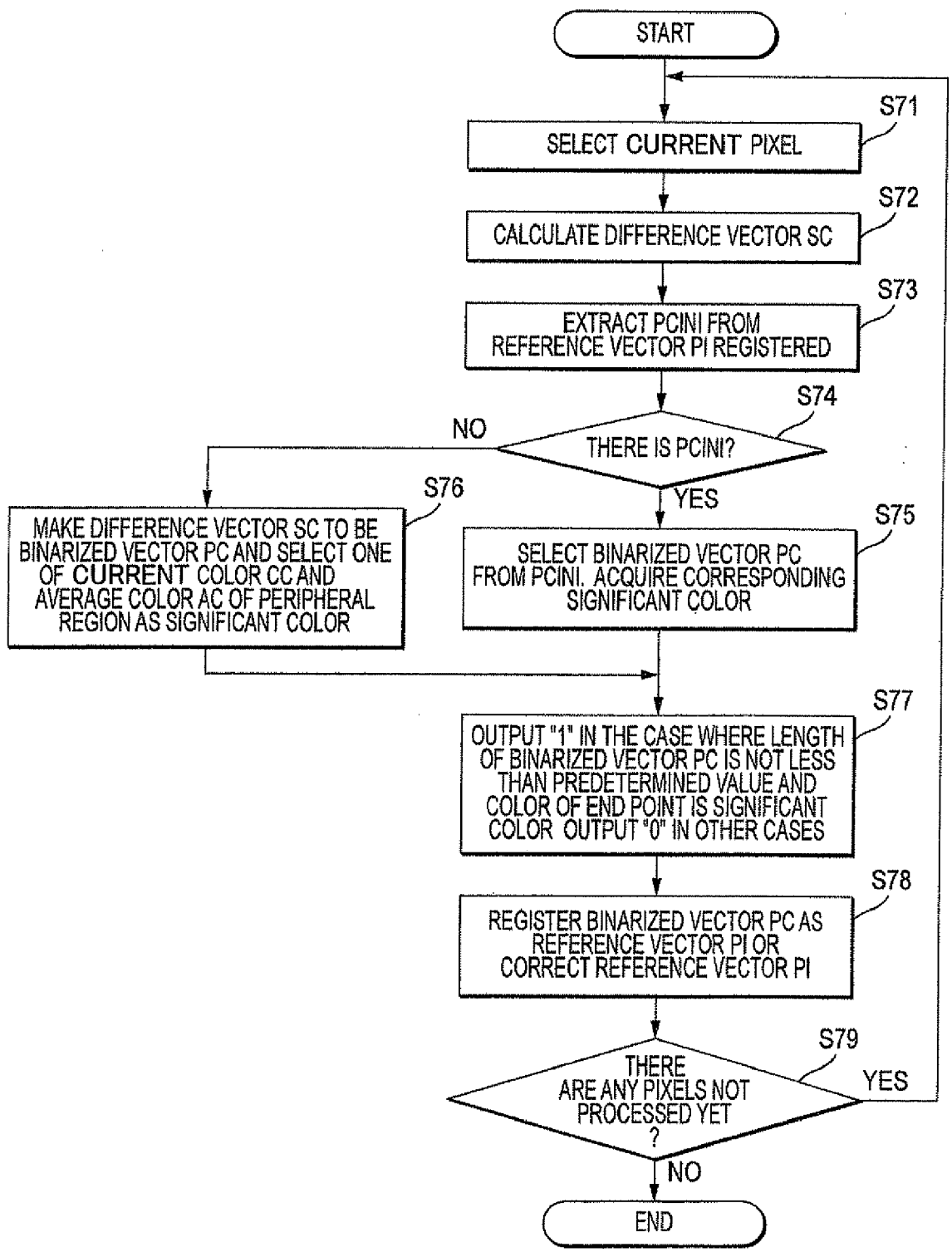
FIG. 6 is a flow chart showing an example of the action in the second embodiment of the present invention.

FIG. 6 is a flow chart showing an example of the action in the second embodiment of the present invention. In S71, a pixel, which has not been processed yet, in the image to be processed is made to be a current pixel and a predetermined size region containing the current pixel is made to be a peripheral pixel region.

In S72, the difference vector calculation portion 11 calculates the difference vector Sc between the current color Cc and the average color Ac in the peripheral pixel region.

In S73, the selecting portion 12 extracts the difference vector Sc and the reference vector Pcini in a predetermined error range from the reference vectors Pi stored in the reference vector storage portion 22. For example, the reference vector Pcini, the angle $\theta$ with the difference vector Sc of which is not more than a predetermined angle, may be extracted.

In S74, it is judged whether or not the reference vector Pcini could be extracted. In the case where the reference vector Pcini could be extracted, in S75, the binarized vector Pc is selected from the extracted reference vector Pcini. For example, the binarized vector Pc, the frequency of the use of which is high, may be selected. Together with the selection of the binarized vector Pc, the corresponding significant color is acquired.

In the case where it is judged in S74 that the reference vector Pcini could not be extracted, in S76, the difference vector Sc calculated in S72 is made to be the binarized vector Pc and one of the average color Ac and the current color Cc is selected as a significant color. Concerning the method of selecting the significant color, the method, which has already been described in the first embodiment, may be used.

In S77, in the case where a length of the binarized vector Pc is not less than a predetermined value and a color on the end portion side of the binarized vector Pc is selected as a significant color, the outputting portion 13 outputs one of the binarized values, for example, "1" is outputted as a value after the binarization of the current pixel. In the case except for that, the output portion 13 outputs the other value, for example, "0" as a value after the binarization of the current pixel.

In S78, in the case where the binarized vector Pc is a difference vector Sc, the reference vector registration portion 21 registers the difference vector Sc in the reference vector storage portion 22 as a reference vector together with the significant color. In the case where the binarized vector Pc is the reference vector Pcini that has been read out from the reference vector storage portion 22, the binarized vector Pc (=the reference vector Pcini) is corrected by the difference vector Sc, so that the reference vector Pcini is rewritten. The correction may be made in such a manner that the reference vector is rewritten by the vector which is calculated out by the expression Pc×t+Sc×(1−t). However, t is a real number of $0 \leq t \leq 1$. In this connection, concerning the rewritten reference vector, 1 is added to the frequency of the use.

In S79, it is judged whether or not there are pixels remaining which have not been processed yet. In the case where there are pixels remaining which have not been processed yet, the program is returned to S71 and a current pixel is selected from the remaining pixels and the above processing is executed. When all the remaining pixels have been processed, the processing is completed.

Figure 7A:
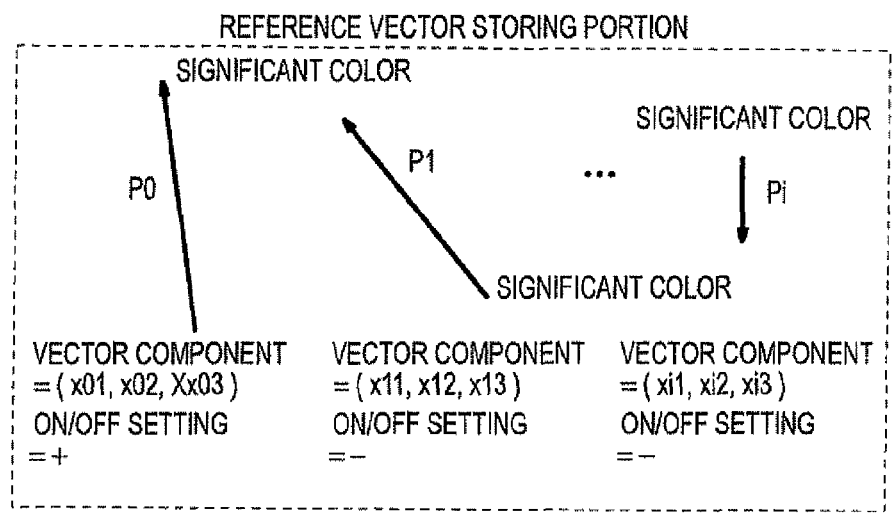
FIGS. 7A to 7C are schematic illustrations showing an example of the specific action in the second embodiment of the present invention.
Figure 7B:
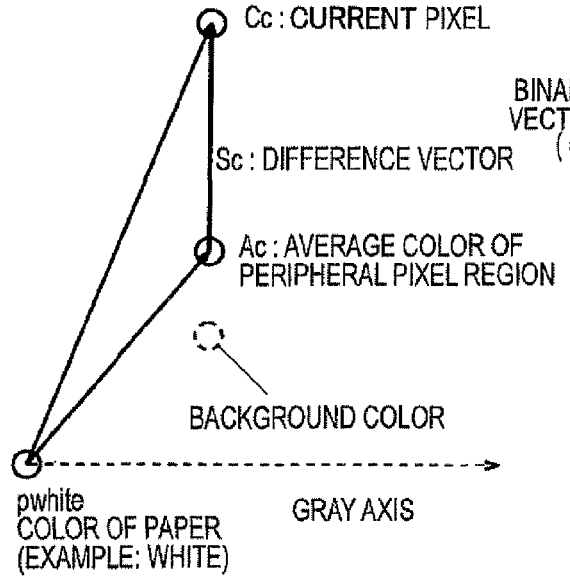
Figure 7C:
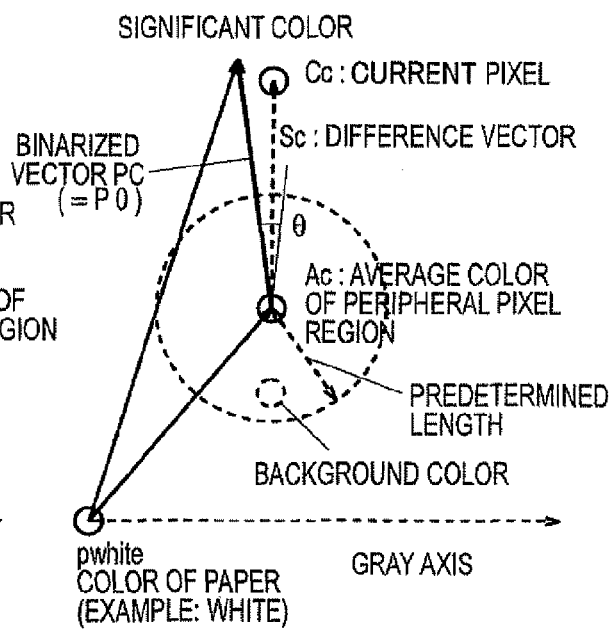

FIGS. 7A to 7C are schematic illustrations showing an example of the specific action in the second embodiment of the present invention. In FIG. 7A, several reference vectors Pi stored in the reference vector storage portion 22 are shown. In this example, each reference vector Pi includes a vector component and an item of ON/OFF setting showing that one of the starting point and the ending point is selected as a significant color. Concerning this item of ON/OFF setting, in the case of +, it shows that a color on the ending point side is selected as a significant color. In the case of –, it shows that a color on the starting point side is selected as a significant color.

For example, as explained above in the first embodiment by using FIG. 3, the current pixel and the peripheral pixel region are set and the difference vector Sc is calculated out and the difference vector Sc is shown in FIG. 7k. This difference vector Sc and the reference vector Pcini in a predetermined error range are extracted from the reference vector Pi stored in the reference vector storage portion 22. In this example, the reference vector P0 in the reference vectors shown in FIG. 7A is selected.

Since the reference vectors of 1 or more are selected, the binarized vector Pc is selected from the selected reference vectors. For example, the reference vector P0 is made to be the binarized vector Pc. A relation between the binarized vector Pc and the difference vector Sc is shown in FIG. 7C. By using this binarized vector Pc, the current pixel is binarized. A length of this binarized vector Pc is not less than the predetermined length shown by the circle of the broken line in FIG. 7C. Since the ending point side is a significant color (The setting of ON/OFF is +.), one of the values, for example, "1" is outputted as a value after the current pixel has been binarized.

As described above, since the reference vector Pcini, which is similar to the difference vector Sc, and its significant color are utilized, it is unnecessary to find a significant color with respect to the difference vector So and a value after the binarization can be quickly found by a simple processing. Further, errors with respect to the result of processing in the peripheral pixels are reduced. Of course, when the color difference is higher than a predetermined value, the binarization is executed and the characters are excellently reproduced.

As can be seen in FIG. 7C, in the case where the binarized vector Pc is used, an error with respect to the difference vector Sc is generated. In order to reduce this error, the reference vector P0 used as the binarized vector Pc is corrected so that it can come close to the difference vector Sc and the reference vector P0 is rewritten. When the reference vector is corrected as described above, the binarization processing is executed corresponding to the image.

In the case where the reference vector Pi, the error with the difference vector Sc of which is in a predetermined range, does not exist, as explained in the above first embodiment, one of the average color Ac and the current color Cc is selected as a significant color. In the case where a length of the difference vector Sc is not less than a predetermined value and the current color Cc is selected as a significant color, for example, "1" may be outputted. In the case except for that, for example, "0" may be outputted. In this case, the difference vector Sc is made to be a reference vector and registered in the reference vector storage portion 22 being formed into a set with the significant color.

In the operational example shown in FIG. 6, while each pixel is being binarized as a current pixel, the reference vector is registered in the reference vector storage portion 22 or the reference vector is corrected. However, the constitution is not necessarily limited to this. For example, the following constitution may be adopted. The registration or the correction of the reference vector and the binarization processing, in which the reference vector is used, may be differently executed. First, concerning the image to be processed, without executing the processing of S77 shown in FIG. 6 in order as a current pixel, the reference vector is registered or corrected. After that, concerning the image to be processed, without registering or correcting the reference vector in S78 shown in FIG. 6, the result of the binarization is outputted in order as a significant pixel. When this processing is executed, the binarization processing is executed by using the reference vector on which a tendency of the entire image to be processed is reflected. Accordingly, an error of the binarization can be reduced.

Figure 8:
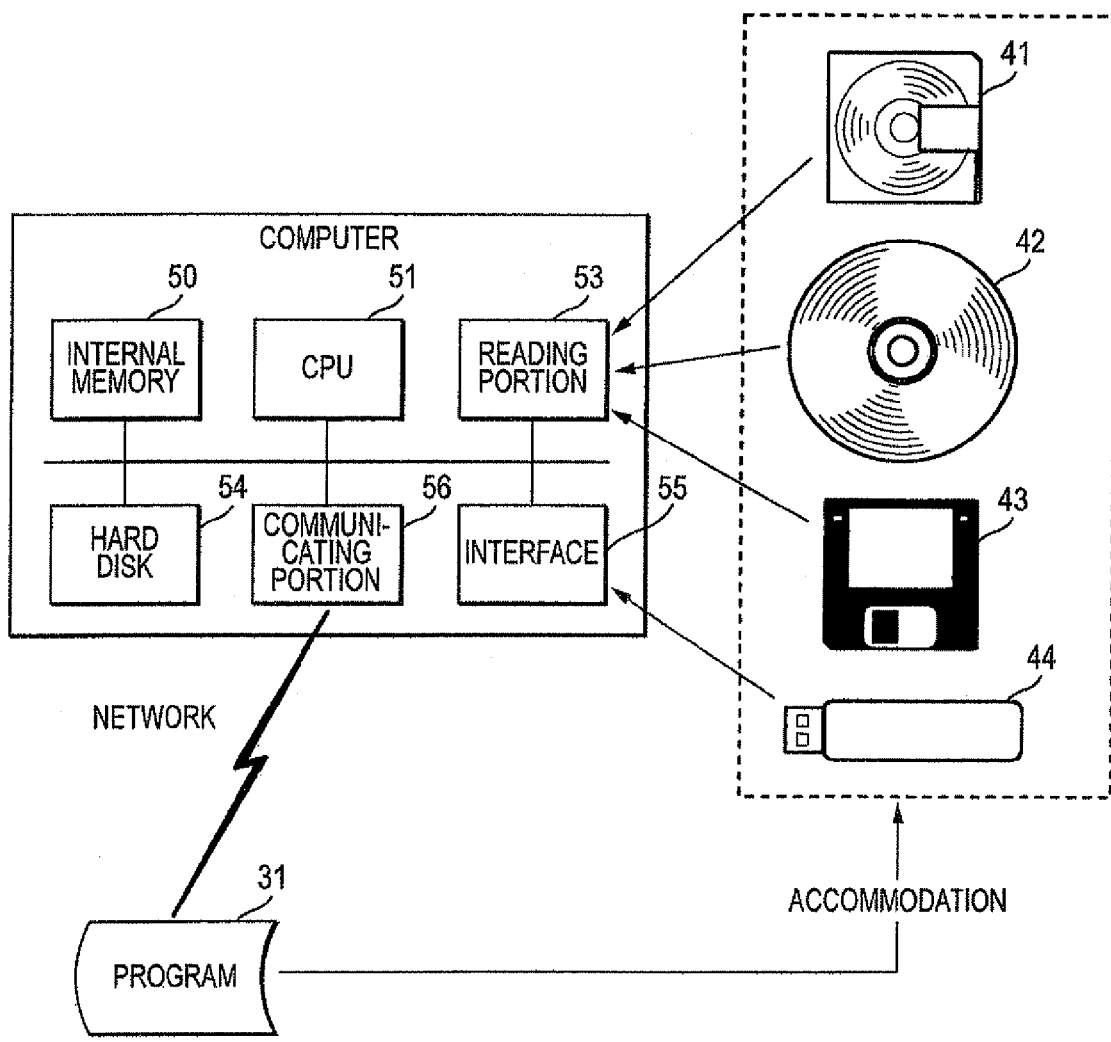
FIG. 8 is a schematic illustration for explaining an example of a computer program, a storage medium in which the computer program is accommodated and a computer in the case where the functions explained in the embodiments of the present invention are realized in the computer program.

FIG. 8 is a schematic illustration for explaining an example of a computer program, storage medium in which the computer program is accommodated and a computer in the case where the functions explained in the embodiments of the present invention are realized in the computer program. In the drawing, reference numeral 31 is a program, reference numeral 32 is a computer, reference numeral 41 is a photo-electro-magnetic disk, reference numeral 42 is an optical disk, reference numeral 43 is a magnetic disk, reference numeral 44 is a memory, reference numeral 51 is a CPU, reference numeral 52 is an internal memory, reference numeral 53 is a reading portion, reference numeral 54 is a hard disk, reference numeral 55 is an interface and reference numeral 56 is a communicating portion.

A portion of the function of each section of each embodiment described above or all the function may be realized by the program 31 capable of being carried out by the computer. In this case, the computer program 31 and data used by the program may be stored in the storage medium that the computer can read. The storage medium is defined as an object capable of causing a change in energy such as magnetism, light or electricity corresponding to a content of the description of the program with respect to the reading portion 53 provided in the hardware resource of the computer and also capable of transmitting the content of the description of the program to the reading portion 53 in the form of a signal corresponding to the change in energy such as magnetism, light or electricity. Examples of the storage medium are: a photo-electro-magnetic disk 41, an optical disk 42 such as CD or DVD, a magnetic disk 43, and a memory 44 including IC card and a memory card. Of course these storage mediums are not limited to a portable type.

When the program 31 is accommodated in these storage mediums and, for example, when these storage mediums are mounted on the reading portion 53 of the computer 32 or on the interface 55, the program 31 is read out from the computer and stored in the internal memory 52 or on the hard disk 54 and carried out by CPU 51. In this way, a portion of the function or all the function of each embodiment explained above may be realized. Alternatively, the program 31 is transferred to the computer 32 through a network and the communication portion 56 in the computer 32 receives the program 31 and stores it in the internal memory 52 or on the hard disk 54. Then, the program 31 is carried out by CPU 51. In this way, a portion of the function of each embodiment of the present invention explained above or all the function may be realized. In this connection, various devices may be connected to the computer 32 through the interface 55. For example, a display device for displaying information or an inputting device, by which a user inputs information, may be connected to the computer 32.

Of course, a portion of the function may be composed by hardware. Alternatively, all the function may be composed of by hardware. Alternatively, the program 31 may be composed together with the other programs. For example, in a device such as a copier including an image reading device and an image forming device, one program is composed together with the control program and an image, which has been read out by the image reading device, may be binarized. Of course, in the case where it is applied to another use, the program may be integrated into one body with the program of the use.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A binarizing device comprising:
a difference vector calculation unit that, in a case where each pixel of a color image is made to be a current pixel in order and a region, which has a predetermined size and includes the current pixel, is set to be a peripheral pixel region, calculates a difference vector between an average color of the peripheral pixel region and a current color of the current pixel;
a selection unit that selects one of the average color and the current color as a significant color; and
an output unit that, in a case where the following conditions (1) and (2) are satisfied, outputs one of binary values, and that, in a case where at least one of the following conditions (1) and (2) is not satisfied, outputs the other of the binary values:
(1) a length of the difference vector is not less than a predetermined value; and
(2) the selection unit selects the current color as a significant color,
wherein
the selection unit calculates a run length of each of the average color and the current color in a plurality of directions in the peripheral pixel region, and selects one of the average color and the current color, which has a shorter run length, as the significant color.

2. The binarizing device as claimed in claim 1, further comprising
a storage that stores a plurality of sets of a reference vector and a significant color selected at the reference vector, wherein
the selection unit determines whether the difference vector, which is calculated by the difference vector calculation unit, and the reference vector, which is in a predetermined error range, are stored in the storage, and
the selection unit, in a case where the difference vector and the reference vector are stored, selects a significant color corresponding to the reference vector.

3. The binarizing device as claimed in claim 2, wherein
the selection unit refers to the reference vector used at a time of binarizing the pixels except for the current pixel in the peripheral region, and determines whether the difference vector and the reference vector in the predetermined error range exist.

4. The binarizing device as claimed in claim 2, further comprising
a registration unit that, in the case where the selection unit determines that the difference vector and the reference vector, which is in the predetermined error range, are not stored in the storage, registers a set of the difference vector and the color, which is selected as a significant color with respect to the difference vector, in the storage.

5. The binarizing device as claimed in claim 4, wherein
the registration unit, in a case where the selection unit determines that the difference vector and the reference vector, which is in the predetermined error range, are stored in the storage, corrects the reference vector by the difference vector, and rewrites the reference vector in the storage.

6. A computer readable medium storing a program causing a computer to execute a process for carrying out a function of the binarizing device according to claim 1.

7. A binarizing device comprising:
a difference vector calculation unit that, in a case where each pixel of a color image are made to be a current pixel in order and a region, which has a predetermined size and includes the current pixel, is set to be a peripheral pixel region, calculates a difference vector between an average color in the peripheral pixel region and a current color of the current pixel;
a selection unit that selects one of the average color and the current color as a significant color; and
an output unit that, in a case where the following conditions (1) and (2) are satisfied, outputs one of binary values, and that, in a case where at least one of the following conditions (1) and (2) is not satisfied, outputs the other of the binary values:
(1) a length of the difference vector is not less than a predetermined value; and
(2) the selection unit selects the current color as a significant color,
wherein
the selection unit selects one of the average color and the current color, which is a lower lightness or a higher chroma, as a significant color.

8. The binarizing device as claimed in claim 7, further comprising
a storage that stores a plurality of sets of a reference vector and a significant color selected at the reference vector, wherein
the selection unit determines whether the difference vector, which is calculated by the difference vector calculation unit, and the reference vector, which is in a predetermined error range, are stored in the storage, and
the selection unit, in a case where the difference vector and the reference vector are stored, selects a significant color corresponding to the reference vector.

9. The binarizing device as claimed in claim 8, wherein
the selection unit refers to the reference vector used at a time of binarizing the pixels except for the current pixel in the peripheral region, and determines whether the difference vector and the reference vector in the predetermined error range exist.

10. The binarizing device as claimed in claim 8, further comprising a registration unit that, in the case where the selection unit determines that the difference vector and the reference vector, which is in the predetermined error range, are not stored in the storage, registers a set of the difference vector and the color, which is selected as a significant color with respect to the difference vector, in the storage.

11. The binarizing device as claimed in claim 10, wherein the registration unit, in a case where the selection unit determines that the difference vector and the reference vector, which is in the predetermined error range, are stored in the storage, corrects the reference vector by the difference vector and rewrites the reference vector in the storage.

12. A computer readable medium storing a program causing a computer to execute a process for carrying out a function of the binarizing device according to claim 7.

* * * * *